S. A. DENNIS.
GLOBE VALVE.
APPLICATION FILED NOV. 21, 1910.

1,004,752.

Patented Oct. 3, 1911.

Witnesses:

Inventor,
Samuel A. Dennis
by Semer G. Wells,
Attorney.

UNITED STATES PATENT OFFICE.

SAMUEL A. DENNIS, OF LOS ANGELES, CALIFORNIA.

GLOBE-VALVE.

1,004,752.  Specification of Letters Patent.  Patented Oct. 3, 1911.

Application filed November 21, 1910. Serial No. 593,345.

*To all whom it may concern:*

Be it known that I, SAMUEL A. DENNIS, a citizen of the United States, residing at Los Angeles, California, have invented a new and useful Globe-Valve, of which the following is a specification.

My object is to improve the details of valves for use in water pipe and the like and my invention consists of the novel features here-in shown, described and claimed.

Figure 1:
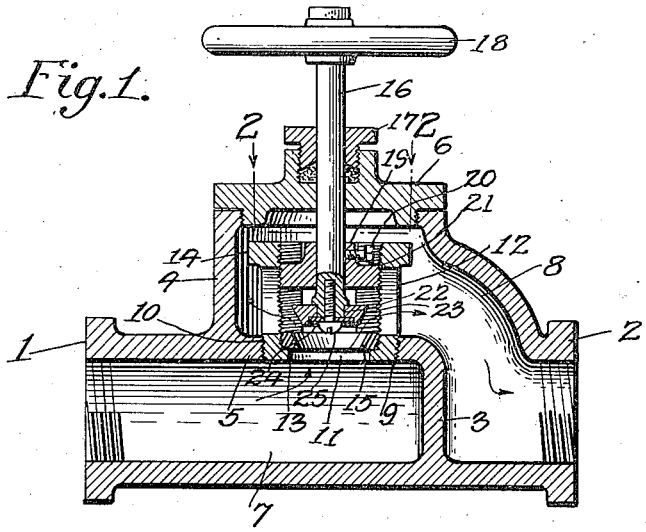
Figure 2:
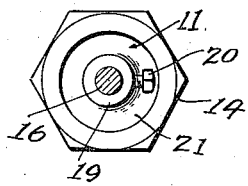
Figure 3:
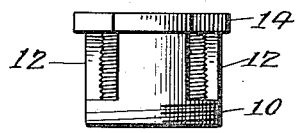

In the drawings: Figure 1 is a vertical-longitudinal-sectional-detail of a valve embodying the principles of my invention. Fig. 2 is a sectional detail on the line 2—2 of Fig. 1 and drawn for the purpose of showing the removable valve cage. Fig. 3 is a side elevation of the valve cage with the other parts omitted.

Referring to the drawings in detail: In Fig. 1 I have shown my invention adapted to take the place of what is known as a globe valve or a straight valve. The same construction may be applied to an angled valve or to a globe angled valve. The main frame of the valve comprises: an inlet nipple 1; an outlet nipple 2; the partition 3 between the inlet nipple 1 and the outlet nipple 2; the valve casing 4 extending upwardly from the nipples 1 and 2; the diaphragm 5 at the bottom of the valve casing 4 and the cap 6 at the top of the valve casing 4; there being a passage 7 through the inlet nipple 1 to the partition 3 and diaphragm 5 and there being a passage 8 from the valve casing 4, around the partition 3, and through the nipple 2; there being an internally screw threaded opening 9 through the diaphragm 5 to receive the valve cage.

The valve cage comprises: an externally screw threaded base ring 10 screw seated in the opening 9 and having a central opening 11; legs 12 extending upwardly from the base ring, concentric to the opening 11; a stop flange 13 extending inwardly from the base ring 10 to support the valve seat and a nut 14 upon the upper end of the legs 12, the opening through the nut and the interior face of the legs of the flange 13 being screw threaded and the nut being of a size that will readily pass upwardly out of the valve casing 4 when the cap 6 is removed. The cage may be constructed of iron or steel.

The valve seat 15 is in the form of a ring exteriorly screw threaded and having a central valve opening and it is screwed downwardly through the nut 14 and the legs 12 to the flange 13. The valve seat is preferably made of brass or bronze. The valve stem 16 extends through the central opening in the cap 6. A stuffing box 17 fits around the valve stem 16 and is carried by the cap 6 and the hand wheel 18 is fixed upon the upper end of the valve stem 16.

The adjusting screw consists of the bearing block 19 fitting upon the valve stem 16 and held adjustably in place by a set screw 20 and an annular flange 21 extending from the bearing block 19 and exteriorly screw threaded to fit the internal screw thread of the valve cage.

In assembling the parts the adjusting screw mechanism is placed upon the valve stem, then the valve stem is inserted upwardly from the cap 6 and the stuffing box 17 and the hand wheel 18 is applied. The lower end of the valve stem 16 is turned to form a pintle 22 and a shoulder at the upper end of the pintle, the valve 23 fits upon the pintle 22, against the shoulder, and is held in place by a washer 24 inserted outwardly against the lower face of the valve 23 and against the lower end of the pintle 22 and a screw 25 is inserted upwardly through the washer and screw seated in the valve stem 16.

The object of this construction is to provide means for removing the valve mechanism bodily from the frame. The cap 6 is unscrewed and raised up against the hand wheel 18 and then the cage is unscrewed from the diaphragm 5 and removed bodily out of the valve casing 4. The construction also provides for a free flow of water through the cage from the valve opening.

It is obvious that many changes may be made in the form and details without departing from the spirit of my invention. The nipple 1 may extend straight down in line with the valve stem 16 so as to make an angle valve, and the form of valve and valve seat may be any of the well known forms now in use.

I wish to call especial attention to the desirability of using an iron cage with a brass valve seat and mounting the case removably in the valve frame.

I claim:

A valve comprising: an inlet nipple, an outlet nipple integral with the inlet nipple, a partition between the inlet nipple and the outlet nipple, a valve casing extending from the nipples, a diaphragm at the bottom of the valve casing, a passage leading through the inlet nipple, then through the diaphragm and through the outlet nipple, the passage through the diaphragm being internally screw threaded to receive the valve cage; and a valve cage mounted in said internally screw threaded passage, said cage comprising an externally screw threaded base ring fitting in the diaphragm, a stop flange extending inwardly from the base ring, legs extending upwardly from the base ring, a nut upon the upper end of the legs, the opening through the nut and the interior face of the legs being screw threaded; a valve seat exteriorly screw threaded and screwed down against the internal flange, a valve stem extending through the casing cap, a bearing block adjustably mounted upon the valve stem, exteriorly screw threaded and fitting in the cage, the lower end of the valve stem being turned to form a pintle, a valve fitting upon the pintle, a washer inserted against the lower face of the valve and against the lower end of the pintle, and a screw inserted upwardly through the washer and screw seated in the valve stem.

SAMUEL A. DENNIS.

Witnesses:
CLARENCE J. WILLIAMS,
HANNA MENDENBALL.